United States Patent [19]
Takezoe et al.

[11] Patent Number: 5,350,436
[45] Date of Patent: Sep. 27, 1994

[54] ALUMINUM ALLOY COMPOSITE MATERIAL FOR BRAZING

[75] Inventors: Osamu Takezoe; Jun Takigawa; Tadashi Okamoto, all of Moka; Mituo Hashiura, Kariya; Sunao Fukuda; Keizo Takeuchi, both of Handa; Yasuaki Isobe, Nagoya, all of Japan

[73] Assignees: Kobe Alcoa Transportation Products Ltd., Tokyo; Nippondenso Co., Ltd., Kariya, both of Japan

[21] Appl. No.: 156,827

[22] Filed: Nov. 24, 1993

[30] Foreign Application Priority Data

Nov. 24, 1992 [JP] Japan .................................. 4-337904

[51] Int. Cl.⁵ .............................................. B32B 15/20
[52] U.S. Cl. ....................................... 75/314; 420/544; 420/548; 420/552; 420/553; 428/548
[58] Field of Search ................... 75/314; 428/544, 546, 428/548; 420/544, 548, 552, 553

[56] References Cited

U.S. PATENT DOCUMENTS 3,994,695 11/1976 Setzer .................................. 420/553
4,448,605 5/1984 Mizuhara ............................ 420/552

Primary Examiner—Peter D. Rosenberg
Attorney, Agent, or Firm—Oblon, Spivak, McClelland, Maier & Neustadt

[57] ABSTRACT

An aluminum alloy composite material for brazing has a core member, an Al—Si filler member clad on one surface of the core member and an aluminum alloy cladding member clad on the other side of the core member. The core member is made of an aluminum alloy containing 0.3 to 1.3 wt. % of Si, 0.3 to 1.5 wt. % of Mn, 0.02 to 0.3 wt. % of Ti, and, as required, 0.3 wt. % or less of Cr and 0.2 wt. % or less of Zr, the content of Mg being restricted to 0.2 wt. % or less and the content of the Cu being restricted to 0.2 wt. % or less as an impurity. The cladding member is made of an aluminum alloy containing 0.3 to 3 wt. % of Mg, 5 wt. % or less of Zn, 0.1 to 1.0 wt. % of Si. The thickness of the core member is preferably, 2.5 times or more greater than that of the filler member, falling within a range of 0.1 to 1 mm. With this, it is possible to obtain an aluminum alloy composite material which cannot degraded in brazability and corrosion resistance even when brazed by the brazing method with noncorrosive flux and which has enough high strength to be used for a material of a high-strength heat exchanger, highly improved corrosion resistance and excellent brazability.

30 Claims, 3 Drawing Sheets

ALUMINUM ALLOY COMPOSITE MATERIAL FOR BRAZING

BACKGROUND OF THE INVENTION

The present invention relates to an aluminum alloy composite material for brazing, which is improved in strength, corrosion resistance and brazability, and which provides remarkable advantages when used for assembly process by brazing method with noncorrosive flux.

Aluminum alloy composite materials for brazing are used for a tube member of a brazed radiator, and the like, and conventionally, brazing sheets comprising an Al—Mn alloy (JIS A3003) core member and an Al—Si filler member clad on the core member are used for this purpose. The brazing sheet with the JIS A3003 core member, however, has a post-brazing strength of not greater than 110 N/mm$^2$ or thereabouts and is not sufficiently resistant to corrosion.

If Mg is added to the aluminum alloy for the core member, the strength of the composite material can be improved, but this results in an increased erosion of the core member due to the filler member and also in a reduction of brazability and corrosion resistance. Particularly, in the case of employing brazing method with noncorrosive flux, the Mg content of the core member in excess of 0.2 weight % entails a substantial drop of the brazability, and accordingly, the addition of Mg to the core member of the aluminum alloy must be restricted.

There has been also presented, in Japanese Published Unexamined Patent Applications No. 175093/1990, No. 198446/1992, No. 198447/1992 and No. 198448/1992, an aluminum alloy composite material for brazing improved in the post-brazing strength without inhibiting brazability. This composite material, however, cannot achieve a satisfactory corrosion resistance when the material is made to be drawn thinner.

Thus, with conventional techniques, it is difficult to obtain a tube member of a brazed radiator which has high strength and high corrosion resistance and yet is excellent in brazability. As for heat exchanger such as an automobile radiator, thin materials are needed to reduce the weight and cost, and accordingly, there is a demand for an aluminum alloy composite material for brazing which has high strength and high corrosion resistance and is excellent in brazability, but no such material has been developed yet.

SUMMARY OF THE INVENTION

It is therefore an object of the present invention to provide an aluminum alloy composite material for brazing suitable for a material to be used for assembly components made particularly by the brazing method with noncorrosive flux.

Another object of the present invention is to provide an aluminum alloy composite material for brazing which has high strength, high corrosion resistance and excellent brazability so as to be able to fabricate assembly components to used for assembling a high-strength heat exchanger without degrading brazability or corrosion resistance.

The present inventors hereof made studies earnestly on aluminum alloy composite materials for brazing which is improved in brazability by decreasing Mg content in a core member and can still more improve the strength as well as corrosion resistance, and have achieved the present invention.

An aluminum alloy composite material for brazing according to the present invention comprises:
 a core member made of an aluminum alloy consisting essentially of 0.3 to 1.3 wt. % of Si, 0.3 to 1.5 wt. % of Mn, 0.02 to 0.3 wt. % of Ti, and as required, 0.3 wt. % or less of Cr and 0.2 wt. % or less of Zr, the content of Mg being restricted to 0.2 wt. % or less and the content of Cu being restricted to 0.2 wt. % or less;
 an Al—Si filler member clad on one surface of the core member; and
 a cladding member of an aluminum alloy clad on the opposite side of the core member, consisting essentially of 0.3 to 3 wt. % of Mg, 5 wt. % or less of Zn and 0.1 to 1.0 wt. % of Si.

The present invention provides a high-strength aluminum alloy composite material which is not lowered in brazability or corrosion resistance even by the brazing method with noncorrosive flux. In particular, when the high-strength aluminum alloy composite material of the present invention is used for tubes to be assembled in an automobile heat exchanger, it provides remarkable effects such as a reduction in thickness and weight of component members for the heat exchanger, reduction in the cost and the like.

DETAILED DESCRIPTION OF THE PREFERRED EMBODIMENTS

The present invention will hereinafter be described in detail with reference to the accompanying drawings.

Figure 1:
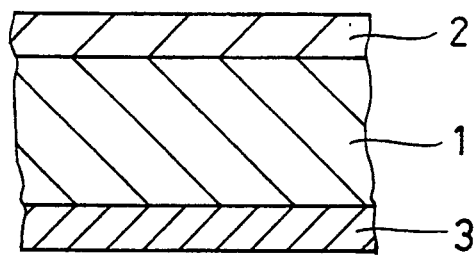
FIG. 1 is a sectional view showing a layered structure of an aluminum alloy composite material for brazing according to a first embodiment of the present invention.

An aluminum alloy composite material for brazing according to a first embodiment of the present invention has a core member 1, as shown in FIG. 1. An Al—Si filler member 3 is clad on one side of the core member 1 and an aluminum alloy cladding member 2 is clad on the other side thereof. When a radiator tube is formed from this composite material, the radiator tube has the cladding member 2 on its inner side and the filler member 3 on its outer side.

The core member 1 that is in contact with the Al—Si filler member 3 is made of an aluminum alloy in which Mg content as an impurity is restricted to 0.2 wt. % or less (preferably 0.1 wt. % or less) and Cu content is restricted to 0.2 wt. % or less. The aluminum alloy contains 0.3 to 1.2 wt. % of Si, 0.3 to 1.5 wt. % of Mn, 0.02 to 0.3 wt. % of Ti, and contains optionally, 0.3 wt. % or less of Cr and 0.2 wt. % or less of Zr.

The cladding member 2 that is clad on the surface of the core member 1 opposite to the filler member 3 is made of an aluminum alloy containing 0.3 to 3 wt. % of Mg, 5 wt. % or less of Zn and 0.1 to 1 wt. % of Si.

The aluminum alloy composite material with the above structure has the following characteristics and thus achieves the intended effects.

In brazing, brazability of the composite material is never lowered since the Mg content of the core member 1 is restricted to a low level. During brazing with heat, Mg diffuses into the core member 1 from the cladding member 2 clad thereon, whereby $Mg_2Si$ is produced in the core member 1, thus enhancing the post-brazing strength in the core member 1. In this case, the region of the core member 1 contacting the filler member 3 has the lowest Mg content in the core member 1 since the Mg is supplied to the core member 1 on the side of the core member 1 opposite to the filler member 3 and diffuses in the core member. Thus, the strength of the composite material can be improved without reducing brazability.

Cu content in the core member 1 is effective to enhance the post-brazing strength, but Al—Mg—Si—Cu compounds precipitate at grain boundaries after brazing to increase sensitivity to intergranular corrosion, thereby inhibiting corrosion resistance. Therefore, the Cu content in the core member must be restricted to 0.2 wt. % or less. This restriction of the Cu content may contribute to solving the insufficiency of corrosion resistance in the aforementioned prior art.

In Japanese Published Unexamined Patent Application No. 175093/1990, as no restriction was not imposed on Ti content of the composition for the core member, the corrosion resistance was found out to be insufficient. On the contrary, the core member 1 of the present invention is added as essential components with Mn, Si and Ti, and this is because these alloy elements are indispensable for improving the strength and corrosion resistance of the core member 1.

Further, pertinent additions of Cr, Zr and the like may control crystalline grain shape in the core member 1, and this effectively improves brazability. The addition of Mg within an aforementioned restricted range hardly lowers brazability and therefore contributes to improve strength.

The cladding member 2 clad on the side of the core member 1 opposite to the filler member 3 is made of an aluminum alloy containing 0.3 to 3 wt. % of Mg, 5 wt. % or less of Zn and 0.1 to 1 wt. % of Si. Mg in the cladding member 2 diffuses into the core member 1 during brazing as stated above to form $Mg_2Si$ in the core member 1, thus enhancing the post-brazing strength. Si produces $Mg_2Si$ inside a layer of the cladding member 2 to improve the post-brazing strength. Zn can further improve the function of the sacrificial anode, and establish excellent corrosion resistance.

Thus, during brazing, the core member 1 serves to restrain the diffusion of Si from the filler member 3 as well as the diffusion of Mg from the cladding member 2 clad on the surface of the core member 1 on the opposite side. An optimal thickness of the core member 1 is determined such that improvement of the strength may be maximized while the aforementioned effect can be obtained simultaneously.

The aluminum alloy composite material according to the invention has the above-stated effects. Now, the reason for limiting the components in each alloy will be described.

(1) Core Member

The allowable amount of Mg contained as impurity in the core member 1 before brazing is defined as 0.2 wt. % or less, so as to prevent the brazability from being lowered. If the Mg content is in excess of the allowable level, the brazability is unfavorably lowered especially during brazing by the brazing method with noncorrosive flux.

Cu is effective to enhance the strength as well as improve the corrosion resistance on the filler member side. In spite of this, Cu could increase sensitivity to intergranular corrosion and therefore lower the corrosion resistance. Consequently, the Cu content is limited to 0.2 wt. % or less.

Addition of Si in the core member is intended to enhance the strength by Mn—Si fine precipitates as well as to improve the strength by the intermetallic compounds of $Mg_2Si$ precipitated by reactions of Mg diffused from the cladding member 2 with the Si. If the Si content is less than 0.3 wt. %, the advantage of Si is insufficient and the Si content in excess of 1.3 wt. % lowers the melting point of the core member 1 resulting in impracticability.

By adding Mn to the core member 1, corrosion resistance, brazability and strength can be improved. The adding amount of Mn for this purpose is to fall within a range of 0.3 to 1.5 wt. %. If the addition of Mn is less than 0.3 wt. %, the above advantages are not fully achieved, whereas the Mn content is greater than 1.5 wt. %, large compounds are produced and thus the workability is lowered unfavorably.

Addition of Ti may further improve corrosion resistance. A preferable amount of Ti to be added for this purpose is 0.02 to 0.3 wt. %. If the content of Ti is less than 0.02 wt. %, improvement of corrosion resistance can not be achieved, and if the content of Ti exceeds 0.3 wt. %, the effect will reach saturation, and production of large compounds arises, thus disadvantageously resulting in low workability.

One of remarkable differences from the prior art disclosed in Japanese Published Unexamined Patent Application No. 175093/1990 resides in that the core member of the material of the present invention essentially contains Ti. As mentioned above, Ti is indispensable for improving corrosion resistance. The mechanism is performed such that Ti precipitates to form Ti-rich layers in the core member 1, to thereby inhibit a pitting corrosion from propagating toward the depth, and Ti makes the electrical potential of the core member 1 change toward positive. Since Ti diffuses at a slow speed in an aluminum alloy and moves not so far during brazing, Ti component effectively maintains the potential difference between the core member 1 and the filler member 3, or between the core member 1 and the cladding member 2 so as to prevent the core member 1 from being electrochemically corroded.

Further addition of at least one element of Cr and Zr to the core member 1 as required may improve corrosion resistance, strength and brazability still more. To achieve this, the addition of Cr is 0.3 wt. % or less and the addition of Zr is 0.2 wt. % or less. As these contents exceed respective upper limits, the effect will reach saturation and lowering of workability could arise disadvantageously. A preferable amount of Cr is within a range of 0.02 to 0.3 wt. % whereas a preferable amount of Zr is within a range of 0.02 to 0.2 wt. %. Addition of Cr is preferable to that of Zr.

It is essential that the core member 1 should block the Mg diffusion from the cladding member 2 during brazing so as not to reach the surface of the filler member 3. An optimal thickness of the core member 1 is determined such that the strength may be maximized while the aforementioned effect can be obtained simultaneously. A preferable thickness of the core member 1 is 2.5 times or more greater than that of the filler member 3 and should fall within a specific range of 0.1 to 1 mm.

(2) Cladding member

The cladding member 2 clad on the surface of the core member 1 on the side opposite to the filler member 3 is made of an aluminum alloy containing 0.3 to 3 wt. % of Mg, 0.5 wt. % or less of Zn and 0.1 to 1.0 wt. % of Si. It is also possible to function the cladding member 2 as a sacrificial anode when the composite material is used as for a radiator tube and the like, and this can improve corrosion resistance markedly.

The Mg content in the cladding member 2 should be in the range of 0.3 to 3.0 wt. %, though the content depends the brazing conditions and the like. If the Mg content is less than 0.3 wt. %, the improvement in strength is insufficient, and if the Mg content is greater than 3.0 wt. % then cladding unfavorably becomes difficult.

Si is a component that can improve the strength of the cladding member 2, and if the Si content is less than 0.1 wt. % the above advantages can not be obtained enough. When the Si content exceeds 1.0 wt. %, it is not preferable because the cladding member 2 reduces in its melting temperature. That is, the lowering of the melting temperature tends to increase the risk of burning during brazing. Accordingly, the Si content is to fall within a range of from 0.1 to 1.0 wt. %.

When the cladding member 2 is to be used as a sacrificial anode, it is effective to add elements transferring the potential toward positive, e.g., Mn, Cu, Ti, Cr and the like, to the core member 1; in addition, to increase anodical potential of the cladding member 2, Zn may be added to the cladding member 2. The amount of Zn be added is preferably 5 wt. % or less, and the content of Zn in excess of the level might contaminate the furnace during brazing.

In this connection, if the composite material is made thicker, Mn, Cu, Ti, Zr and the like can be added to the cladding member 2 clad in order to improve strength. In this case, the amount of each element to be added may be the same with that in the core member 1.

(3) Filler Member

As a filler member, Al—Si alloys such as, for instance, A4045 and the like can be used as in the prior art. It is also possible to add Zn to the filler member 3 in order to actively function the filler member 3 as a sacrificial anode. Preferable amount of Zn to be added to the filler member 3 may be the same with the added amount to the cladding member 2.

(4) Other Conditions

The composite material is as enough thick as 0.4 mm or less if it is used for tube members of a radiator, because the strength is sufficiently increased by the diffusion of Mg from the cladding member 2 clad on the core member 1.

The present invention is the most effective when applied to the brazing method with noncorrosive flux which can extremely degrade brazability due to Mg, but of course, it can be applied to other brazing methods such as atmosphere brazing, flux brazing, vacuum brazing, and the like.

Figure 2:
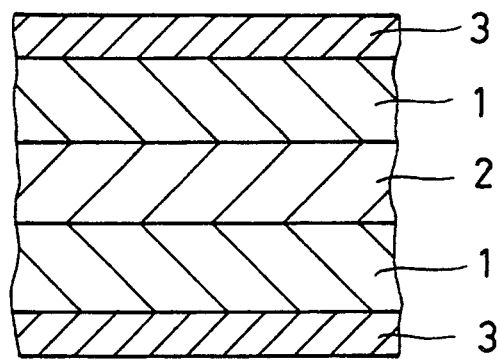
FIG. 2 is a sectional view showing a layered structure of an aluminum alloy composite material for brazing according to a second embodiment of the present invention.

In addition, if, as shown in FIG. 2, aluminum alloy core members 1 containing substantially no Mg are clad on both surfaces of an aluminum alloy cladding member 2 containing Mg and Al—Si filler members 3 are clad on both outside surfaces of the resultant structure, then the product can be used as a double-sided brazing sheet.

In order to assemble a radiator tube, it is possible to form the composite material into a seam welded pipe. More specifically, in order to form a tube, the composite material is bent into a tubular form with the filler member outside and the butt ends are welded by the high frequency induction welding while the ends pressed.

On the other hand, for the improvement in the corrosion resistance of the inner surface of the radiator tube, the most effective measure is to use the cladding member 2 as a sacrificial anode for the core member 1. Since the brazing method with noncorrosive flux is carried out under atmospheric pressure, Zn scarcely vaporizes but is diffused into the core member 1 by the brazing heat, thus decreasing the surface concentration. To greatly improve the corrosion resistance of the inner surface (coolant-side surface) of the radiator tube by the sacrificial anode effect of the cladding member 2, the difference of pitting potentials between the surface of the cladding member 2 and the core member 1 need be not smaller than 30 mV. However, if the difference of the pitting potentials is greater than 120 mV, the consumption rate of the cladding member 2 is large and thus the sacrificial anode effect cannot be maintained for a long period of time. The difference of the pitting potentials between the cladding member 2 and the core member 1 varies depending on the composition of the cladding member 2 and the composition of the core member 1 and the brazing conditions, but if the pitting potential difference after the brazing with noncorrosive flux is within the range of 30 to 120 mV, excellent corrosion resistance can be enjoyed for a long time.

Next, description will be made of examples of aluminum alloy composite materials for brazing which were prepared to be compared in their characteristics with comparative examples.

For the following examples 1 to 5, aluminum alloys (core member, cladding member and filler member) having the chemical compositions shown in Table 1 were prepared. In Table 1, No. 1 to No. 11 alloys were used for the core member, No. 12 to No. 18 alloys for the cladding member clad on the side of the core member opposite to the filler member, and No. 19 alloy (4045 alloy) for the filler member.

These aluminum alloys were combined as shown in Table 2, to produce samples of aluminum alloy composite materials for brazing having the structure shown in FIG. 1.

TABLE 1

Chemical Composition of Aluminum Alloy used in Aluminum Alloy Composite Material for Brazing (Wt %)

| Alloy No. | Si | Cu | Mn | Mg | Zn | Cr | Zr | Ti | Al | | |
|---|---|---|---|---|---|---|---|---|---|---|---|
| 1 | 0.8 | 0.05 | 1.1 | 0.01 | 0.0 | 0.00 | 0.00 | 0.12 | bal | Core | Example |
| 2 | 0.8 | 0.15 | 1.1 | 0.01 | 0.0 | 0.00 | 0.00 | 0.12 | bal | Member | |
| 3 | 0.8 | 0.05 | 1.1 | 0.01 | 0.0 | 0.10 | 0.00 | 0.12 | bal | | |
| 4 | 0.8 | 0.05 | 1.1 | 0.01 | 0.0 | 0.10 | 0.10 | 0.12 | bal | | |
| 5 | 0.8 | 0.05 | 0.4 | 0.00 | 0.0 | 0.10 | 0.00 | 0.12 | bal | | |
| 6 | 0.4 | 0.05 | 1.1 | 0.00 | 0.0 | 0.00 | 0.00 | 0.12 | bal | | |
| 12 | 0.35 | — | — | 2.1 | 2.2 | — | — | — | bal | | Comparative |
| 13 | 0.6 | — | — | 2.1 | 2.2 | — | — | — | bal | | Example |
| 14 | 0.35 | — | — | 2.1 | 4.0 | — | — | — | bal | | |
| 15 | 0.35 | — | — | 0.5 | 2.2 | — | — | — | bal | | |
| 16 | 0.35 | — | — | 1.0 | 2.2 | — | — | — | bal | | |
| 7 | 0.8 | 0.3 | 1.1 | 0.01 | 0.0 | 0.09 | 0.00 | 0.12 | bal | Cladding | Example |
| 8 | 0.8 | 0.05 | 1.1 | 0.01 | 0.0 | 0.00 | 0.00 | 0.00 | bal | Member | |
| 9 | 0.8 | 0.05 | 1.1 | 0.25 | 0.0 | 0.00 | 0.00 | 0.12 | bal | | |
| 10 | 0.2 | 0.05 | 1.1 | 0.00 | 0.0 | 0.00 | 0.00 | 0.12 | bal | | |
| 11 | 0.8 | 0.05 | 1.1 | 0.00 | 0.0 | 0.00 | 0.00 | 0.12 | bal | | |
| 17 | 0.04 | — | — | 2.1 | 2.2 | — | — | — | bal | | Comparative |
| 18 | 0.04 | — | — | 2.1 | 2.2 | — | — | — | bal | | Example |
| 19 | 10.5 | 0.01 | 0.01 | 0.00 | 0.02 | 0.00 | 0.00 | 0.02 | bal | | Filler Member 4045 | bal: balance

TABLE 2

Structure of Aluminum Alloy Composite Material for Brazing

| | No. | Core Member Alloy No. | Core Member Thickness (mm) | Cladding Member Alloy No. | Cladding Member Thickness (mm) | Filler Member Alloy No. | Filler Member Thickness (mm) | Total Thickness of sheet (mm) |
|---|---|---|---|---|---|---|---|---|
| Example | 1 | 1 | 0.24 | 12 | 0.03 | 19 | 0.03 | 0.30 |
| | 2 | 2 | 0.24 | 12 | 0.03 | 19 | 0.03 | 0.30 |
| | 3 | 3 | 0.24 | 12 | 0.03 | 19 | 0.03 | 0.30 |
| | 4 | 4 | 0.24 | 12 | 0.03 | 19 | 0.03 | 0.30 |
| | 5 | 5 | 0.24 | 12 | 0.03 | 19 | 0.03 | 0.30 |
| | 6 | 6 | 0.24 | 12 | 0.03 | 19 | 0.03 | 0.30 |
| | 7 | 1 | 0.24 | 13 | 0.03 | 19 | 0.03 | 0.30 |
| | 8 | 1 | 0.24 | 14 | 0.03 | 19 | 0.03 | 0.30 |
| | 9 | 1 | 0.24 | 15 | 0.03 | 19 | 0.03 | 0.30 |
| | 10 | 1 | 0.24 | 16 | 0.03 | 19 | 0.03 | 0.30 |
| Comparative Example | 1 | 7 | 0.24 | 12 | 0.03 | 19 | 0.03 | 0.30 |
| | 2 | 8 | 0.24 | 12 | 0.03 | 19 | 0.03 | 0.30 |
| | 3 | 9 | 0.24 | 12 | 0.03 | 19 | 0.03 | 0.30 |
| | 4 | 10 | 0.24 | 12 | 0.03 | 19 | 0.03 | 0.30 |
| | 5 | 11 | 0.24 | 12 | 0.03 | 19 | 0.03 | 0.30 |
| | 6 | 1 | 0.24 | 17 | 0.03 | 19 | 0.03 | 0.30 |
| | 7 | 1 | 0.24 | 18 | 0.03 | 19 | 0.03 | 0.30 |

Test 1

Each aluminum alloy composite material for brazing having a different combination shown in Table.2 was applied with 5 g/m$^2$ noncorrosive brazing flux on the filler member thereof, dried and then heated at 600° C. for 5 minutes in a nitrogen gas atmosphere having a dew point of −40+ C. The evaluation results on brazing for each are shown in Table.3 below.

Here, in the practical radiator fabricating process, a composite material made up of core member 1, cladding member 2 and filler member 3 is formed into a tube 4. Then, disposed between the tubes 4 are fins 5 inserted into headers 6. Thereafter, tubes 4, fins 5 and headers 6 will be brazed one another while combined in the above-stated way.

However, the evaluation on brazability of the composite materials of the test example was made in terms of flow factor obtained in dropping test in order to represent the evaluation in a simple, quantitative manner. The result is shown in Table 3 below. As shown in Table 3, the examples 1 to 10 are all found to have excellent brazability.

Test 2

The aluminum alloy composite materials heated under the same condition as in Test 1 were left for 7 days in room temperature, and then subjected to a tensile test. The result is shown in Table 3 below.

Any one of examples 1 to 10 has as a high strength after brazing as 150 N/mm$^2$ or more.

Test 3

The aluminum alloy composite materials heated under the same condition as in Test 1 were subjected to a CASS test to evaluate the corrosion resistance on the filler member side. The evaluation results after the CASS test for 250 hours are shown in Table 3. As indicated in Table.3 under the caption "Corrosion Depth of Filler Member Side", any one of examples 1 to 10 is found to have an excellent corrosion resistance.

Test 4

The aluminum alloy composite materials heated under the same condition as in Test 1 were subjected to an immersion test by immersing the composite materials in artificial water (Cl: 300 ppm; SO$_4$: 100 ppm; Cu$^+$: 5 ppm) for 30 days under repeated alternate temperature conditions of 88° C. for 8 hours and room temperature for 16 hours, to evaluate the corrosion resistance of the cladding member 2 clad on the core member 1 opposite to the filler member The results of the immersion test are shown in Table 3. As indicated in Table 3 under the caption "Corrosion Depth of Cladding Member Side", any one of the examples 1 to 10 is found to have an excellent corrosion resistance.

Test 5

For each of the aluminum alloy composite materials heated under the same condition as in Test 1, the pitting potential of the surface of the cladding member 2 clad on the side of the core member 1 opposite to the filler member 3, the pitting potential of the surface of the filler member 3 and the pitting potential of the core member 1 which was exposed by mechanically removing the cladding member 1 with emery grinding paper were measured under the following condition.
Measuring Condition
Electrolyte: 3.5% NaCl, (deaeration)
Temperature: 25° C.
Measuring Method: Potential scanning by using a potentiostat(sweep speed: 10 mV/min.)

The measured differences of pitting potentials between the core member 1 and the cladding member 2 are shown in Table.3. As shown in Table 3, all the differences of pitting potentials between the core member 1 and cladding member 2 of the aluminum alloy composite materials for brazing in examples 1 through 10 fell within the range of 30 to 120 mV.

Test 6

Figure 4:
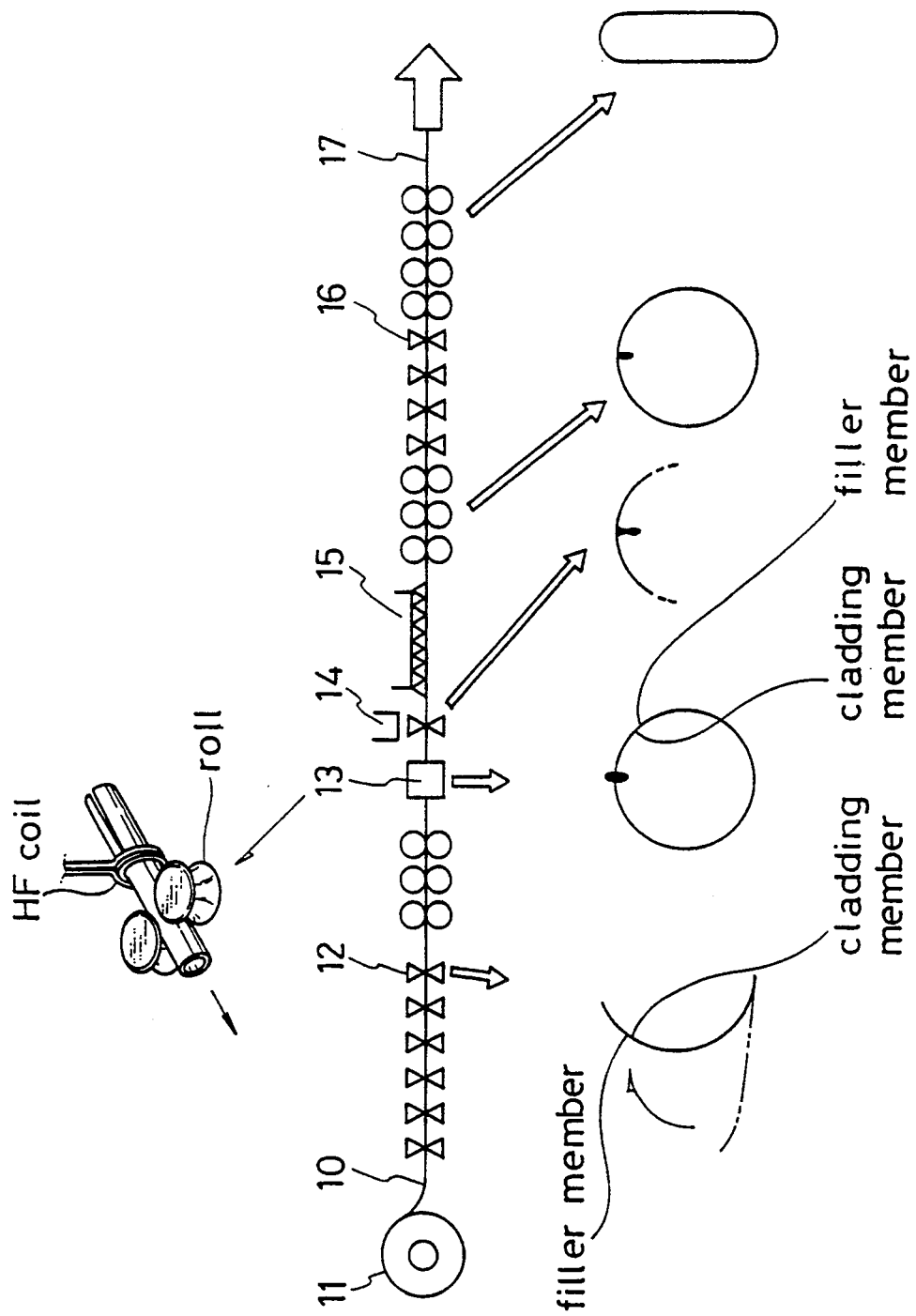
FIG. 4 is a schematic view showing a fabrication process of a pipe of an aluminum alloy composite material for brazing according to the present invention.

A material for a tube made of alloys No. 1 (as the core member), No. 12 (as the cladding member) and No. 19 (as the filler member) shown in Table 1 was formed by a pipe-fabricating process shown in FIG. 4 into a pipe having the filler member outside. As a result, a good welded portion was obtained.

In the pipe-fabricating process shown in FIG. 4, a plate material 10 of an aluminum alloy composite material delivered from an uncoiler 11 is formed by fin pass rolls 12 into a circular pipe having the filler member outside. Subsequently, the thus formed material having a circular section is welded at its ends in the circular direction by a high frequency induction welding machine 13 equipped with pressure rolls and a high frequency coil. After welding, the bead of the welded pipe is removed by means of a bead cutter 14 while spatter, shavings and the like generated during welding are cleaned and removed. Then, the circular tube is compressed by sizing rolls 16 into a compressed pipe 17 having predetermined dimensions.

Here, the welding is performed under the following condition:
Frequency: 400 kHz
Current: 3.7 mA
Voltage: 6.7 kV
Amount of upset: 200 μm
Pipe-fabricating speed: 90 m/min.

Figure 3:
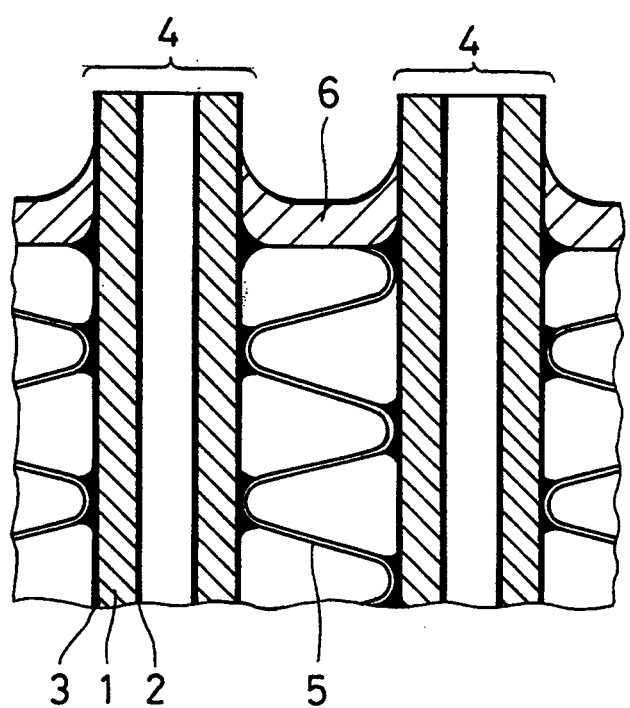
FIG. 3 is a sectional view showing a part of a radiator which is assembled by connecting tubes, headers and fins.

Thereafter, tubes 4, headers 6 and fins 5 were assembled as shown in FIG. 3, and the assembly was spray coated with 3 g/m$^2$ noncorrosive brazing flux, and dried and then heated at 600° C. for 5 minutes in a nitrogen gas atmosphere with an oxygen concentration of 300 ppm having a dew point of −40° C. As a result, fillet forming was good for each welded portion.

As apparent from the result shown in Test 1 through 7, all the examples 1 to 10 of the present invention will neither lose brazability or corrosion resistance and can be used as high strength tubes.

TABLE 3

| | | Testing Results of Evaluation on Aluminum Alloy Composite Materials | | | | |
|---|---|---|---|---|---|---|
| | No. | Brazability (Flow Factor) (%) | Tensile Strength (N/mm$^2$) | Corrosion of Filler Member Side Corrosion Depth (mm) | Corrosion of Cladding Member Side Corrosion Depth (mm) | Cladding Member/ Core Member Potential Difference (mV vs SCF) |
| Example | 1 | 70 | 173 | 0.08 | 0.03 | 70 |
| | 2 | 70 | 176 | 0.11 | 0.03 | 85 |
| | 3 | 70 | 173 | 0.07 | 0.03 | 72 |
| | 4 | 75 | 171 | 0.08 | 0.03 | 72 |
| | 5 | 70 | 163 | 0.13 | 0.03 | 50 |
| | 6 | 70 | 157 | 0.08 | 0.03 | 40 |
| | 7 | 60 | 183 | 0.05 | 0.03 | 70 |
| | 8 | 70 | 174 | 0.08 | 0.03 | 110 |
| | 9 | 70 | 162 | 0.08 | 0.03 | 68 |
| | 10 | 70 | 167 | 0.08 | 0.03 | 69 |
| Comparative Example | 1 | 70 | 181 | 0.08 | 0.20 | 96 |
| | 2 | 65 | 173 | 0.16 | 0.05 | 64 |
| | 3 | 35 | 188 | | 0.20 | 50 |
| | 4 | 65 | 132 | 0.10 | 0.03 | 70 |
| | 5 | 45 | 157 | 0.19 | 0.20 | 20 |
| | 6 | 70 | 162 | 0.08 | 0.03 | 70 |
| | 7 | 70 | 141 | 0.09 | 0.03 | 70 |

What is claimed is:
1. An aluminum alloy composite material for brazing comprising:
a core member made of an aluminum alloy consisting essentially of 0.3 to 1.3 wt. % of Si, 0.3 to 1.5 wt. % of Mn and 0.02 to 0.3 wt. % of Ti, the content of Mg being restricted to 0.2 wt. % or less and the content of Cu being restricted to 0.2 wt. % or less as impurity;

an Al—Si filler member clad on one surface of said core member; and a cladding member of an aluminum alloy clad on the opposite side of said core member, consisting essentially of 0.3 to 3 wt. % of Mg, 5 wt. % or less of Zn and 0.1 to wt. % of Si.

2. An aluminum alloy composite material for brazing comprising:

a core member made of an aluminum alloy consisting essentially of 0.3 to 1.3 wt. % of Si, 0.3 to 1.5 wt. % of Mn, 0.02 to 0.3 wt. % of Ti, 0.3 wt. % or less of Cr and 0.2 wt. % or less of Zr, the content of Mg being restricted to 0.2 wt. % or less and the content of Cu being restricted to 0.2 wt. % or less as impurity;

an Al—Si filler member clad on one surface of said core member; and a cladding member of an aluminum alloy clad on the opposite side of said core member, consisting essentially of 0.3 to 3 wt. % of Mg, 5 wt. % or less of Zn and 0.1 to 1.0 wt. % of Si.

3. An aluminum alloy composite material for brazing comprising:

a core member made of an aluminum alloy consisting essentially of 0.3 to 1.3 wt. % of Si, 0.3 to 1.5 wt. % of Mn, 0.02 to 0.3 wt. % of Ti and 0.02 to 0.3 wt. % of Cr, the content of Mg being restricted to 0.2 wt. % or less and the content of Cu being restricted to 0.2 wt. % or less as an impurity;

an Al—Si filler member clad on one surface of said core member; and a cladding member of an aluminum alloy clad on the opposite side of said core member, consisting essentially of 0.3 to 3 wt. % of Mg, 5 wt. % or less of Zn and 0.1 to wt. % of Si.

4. An aluminum alloy composite material for brazing comprising:

a core member made of an aluminum alloy, consisting essentially of 0.3 to 1.3 wt. % of Si, 0.3 to 1.5 wt. % of Mn, 0.02 to 0.3 wt. % of Ti, 0.02 to 0.3 wt. % of Cr and 0.2 wt. % or less of Zr, the content of Mg being restricted to 0.2 wt. % or less and the content of Cu being restricted to 0.2 wt. % or less as an impurity;

an Al—Si filler member clad on one surface of said core member; and a cladding member of an aluminum alloy clad on the opposite side of said core member, consisting essentially of 0.3 to 3 wt. % of Mg, 5 wt. % or less of Zn and 0.1 to 1.0 wt. % of Si.

5. An aluminum alloy composite material for brazing comprising:

a core member made of an aluminum alloy, consisting essentially of 0.3 to 1.3 wt. % of Si, 0.3 to 1.5 wt. % of Mn, 0.02 to 0.3 wt. % of Ti, the content of Mg being restricted to 0.2 wt. % or less and the content of Cu being restricted to 0.2 wt. % or less as an impurity;

an Al—Si filler member clad on one surface of said core member; and a cladding member of an aluminum alloy clad on the opposite side of said core member, consisting essentially of 0.3 to 3 wt. % of Mg, 2.1 to 5 wt. % of Zn and 0.1 to 1.0 wt. % of Si.

6. An aluminum alloy composite material for brazing comprising:

a core member made of an aluminum alloy consisting essentially of 0.3 to 1.3 wt. % of Si, 0.3 to 1.5 wt. % of Mn, 0.02 to 0.3 wt. % of Ti, 0.3 wt. % or less of Cr and 0.2 wt. % or less of Zr, the content of the Mg being restricted to 0.2 wt. % or less and the content of Cu being restricted to 0.2 wt. % or less as an impurity;

an Al—Si filler member clad on one surface of said core member; and a cladding member of an aluminum alloy clad on the opposite side of said core member, consisting essentially of 0.3 to 3 wt. % Of Mg, 2.1 to 5 Wt. % of Zn and 0.1 to 1.0 wt. % of Si.

7. The aluminum alloy composite material for brazing according to claim 1, wherein said core member has a thickness 2.5 times or more greater than that of said filler member and falling within a range of 0.1 to 1 mm.

8. The aluminum alloy composite material for brazing according to claim 2, wherein said core member has a thickness 2.5 times or more greater than that of said filler member and falling within a range of 0.1 to 1 mm.

9. The aluminum alloy composite material for brazing according to claim 3, wherein said core member has a thickness 2.5 times or more greater than that of said filler member and falling within a range of 0.1 to 1 mm.

10. The aluminum alloy composite material for brazing according to claim 4, wherein said core member has a thickness 2.5 times or more greater than that of said filler member and falling within a range of 0.1 to 1 mm.

11. The aluminum alloy composite material for brazing according to claim 5, wherein said core member has a thickness 2.5 times or more greater than that of said filler member and falling within a range of 0.1 to 1 mm.

12. The aluminum alloy composite material for brazing according to claim 6, wherein said core member has a thickness 2.5 times or more greater than that of said filler member and falling within a range of 0.1 to 1 mm.

13. A tube member in which said aluminum alloy composite material for brazing according to claim 1 is welded into a tube with said filler member outside by the high frequency induction welding.

14. The tube member according to claim 13, wherein said tube is fabricated into a radiator by the brazing method with noncorrosive flux.

15. The tube member according to claim 14, wherein, after brazing, said core member has a pitting potential (positive) higher than a pitting potential of said cladding member and higher than a pitting potential of said filler member, and the differences in pitting potential between said core member and said cladding member and between said core member and said filler member fall in the range of from 30 to 120 mV.

16. A tube member in which said aluminum alloy composite material for brazing according to claim 2 is welded into a tube with said filler member outside by the high frequency induction welding.

17. The tube member according to claim 16, wherein said tube is fabricated into a radiator by the brazing method with noncorrosive flux.

18. The tube member according to claim 17, wherein, after brazing, said core member has a pitting potential (positive) higher than a pitting potential of said cladding member and higher than a pitting potential of said filler member, and the differences in pitting potential between said core member and said cladding member and between said core member and said filler member fall in the range of from 30 to 120 mV.

19. A tube member in which said aluminum alloy composite material for brazing according to claim 3 is welded into a tube with said filler member outside by the high frequency induction welding.

20. The tube member according to claim 19, wherein said tube is fabricated into a radiator by the brazing method with noncorrosive flux.

21. The tube member according to claim 20, wherein, after brazing, said core member has a pitting potential (positive) higher than a pitting potential of said cladding member and higher than a pitting potential of said filler member, and the differences in pitting potential between said core member and said cladding member and between said core member and said filler member fall in the range of from 30 to 120 mV.

22. A tube member in which said aluminum alloy composite material for brazing according to claim 4 is welded into a tube with said filler member outside by the high frequency induction welding.

23. The tube member according to claim 22, wherein said tube is fabricated into a radiator by the brazing method with noncorrosive flux.

24. The tube member according to claim 23, wherein, after brazing, said core member has a pitting potential (positive) higher than a pitting potential of said cladding member and higher than a pitting potential of said filler member, and the differences in pitting potential between said core member and said cladding member and between said core member and said filler member fall in the range of from 30 to 120 mV.

25. A tube member in which said aluminum alloy composite material for brazing according to claim 5 is welded into a tube with said filler member outside by the high frequency induction welding.

26. The tube member according to claim 25, wherein said tube is fabricated into a radiator by the brazing method with noncorrosive flux.

27. The tube member according to claim 26, wherein, after brazing, said core member has a pitting potential (positive) higher than a pitting potential of said cladding member and higher than a pitting potential of said filler member, and the differences in pitting potential between said core member and said cladding member and between said core member and said filler member fall in the range of from 30 to 120 mV.

28. A tube member in which said aluminum alloy composite material for brazing according to claim 6 is welded into a tube with said filler member outside by the high frequency induction welding.

29. The tube member according to claim 28, wherein said tube is fabricated into a radiator by the brazing method with noncorrosive flux.

30. The tube member according to claim 29, wherein, after brazing, said core member has a pitting potential (positive) higher than a pitting potential of said cladding member and higher than a pitting potential of said filler member, and the differences in pitting potential between said core member and said cladding member and between said core member and said filler member fall in the range of from 30 to 120 mV.

* * * * *